United States Patent Office 2,852,401
Patented Sept. 16, 1958

2,852,401

UNSHAPED HIGH TEMPERATURE REFRACTORY

Kenneth W. Hansen, Staten Island, N. Y., and Donald F. King, Mount Lebanon, Pa., assignors to Harbison-Walker Refractories Company, Pittsburgh, Pa., a corporation of Pennsylvania No Drawing. Application June 13, 1955
Serial No. 515,252

4 Claims. (Cl. 106—55)

This invention relates to refractory compositions in the form of unconsolidated dry particles that may be rendered plastic and workable by tempering with water to prepare them for installation, upon which they develop a set strength that increases rapidly up to operating temperature with no period of weakness encountered.

The term "refractories sepecialties" is used by producers and consumers of refractories to identify a group of refractory materials that are produced in a dry and unconsolidated condition for mixing with tempering liquid on the job, or produced in a fluid or plastic condition, but in either case in an unconsolidated, i. e. unshaped, condition as contrasted with pressed or molded refractory brick or other shapes.

The variety of refractories specialties presently available is large, both as to chemical and ceramic composition and also in range of physical conditions such as grind and moisture content. They may be divided into two classes, namely, the heat setting class and the cold or chemical setting class.

The heat setting class includes, for example, ramming mixes shipped in a plastic condition and ready for use, as well as ramming mixes and mortars shipped dry. All such compositions depend upon the heat of the furnace where installed to develop strength by ceramic or vitrification bonding. Typically they are relatively weak below about 2,000° F. Although these compositions may have good workability and satisfactory refractoriness, they suffer from the disadvantage that they may be inadequate in furnace part installations where mechanical stress or abrasion is severe.

The cold or chemical setting class of refractories specialties uses such materials as Portland or gypsum cements, soluble alkali silicates, or to a lesser extent sulfates, chlorides or other chemicals to develop strength. While these bonding agents commonly do produce adequate strength at room temperature, the greatest part of this strengh is lost well below the temperature at which the ceramic bond forms so that they exhibit a zone of weakness from approximately 1,000° to 2,000° F. Not only does this result in a weakness of the installation during the original period of heat-up, but also a zone of weakness persists between the hot and cold faces of furnace walls during operation, which may result in slabbing off of large sections of refractory material. Moreover, refractoriness and load bearing ability are markedly reduced by the fluxing action of such materials as Portland cement and soluble alkali silicates.

That phosphoric acid possesses unusual bonding power for refractory materials has long been recognized and various proposals have been made for its use in the production of refractory products. Up to the present time, however, it has been little used as a binder, except in dental cements, which demonstrates that problems associated with its use in the refractories field have either not been solved or not solved in an economically feasible manner.

One of the principal difficulties with the use of phosphoric acid has arisen from the fact that it is a corrosive liquid and constitutes a distinct safety hazard to personnel when used under conditions which cannot be strictly controlled, such as on a construction job site. Another serious difficulty has been that phosphoric acid added to refractory bases such as tabular or crystalline alumina or calcined clay results in a sandy, non-plastic mixture which remains damp and incoherent until cured at about 450° to 600° F. Such mixtures might be prepared by a refractories manufacturer but they would require special acid-proof packaging, and they would be very difficult to install due to poor workability, lack of wet strength, and failure to develop an air set. Likewise, they would constitute a hazard to the workmen handling them.

It is among the objects of this invention to provide high temperature refractory compositions in the form of unconsolidated particles that are substantially dry to the touch and non-corrosive; that may be shipped in paper or cloth bags and other inexpensive containers; that may be tempered to a plastic and workable state to prepare them for use; that when tempered develop a set strength rapidly that increases with temperature to about 250° F., which strength increases progressively with further increase in temperature and with no weakening or significant loss of refractoriness up to the maximum temperature to which the composition is adapted to serve; and that may be produced readily and inexpensively from readily available materials.

Another object is to provide compositions in accordance with the foregoing object in which use is made of the bonding properties of phosphoric acid while avoiding the disadvantages encountered with previous proposals, and which are harmless to the skin and to commonly used types of containers.

Yet another object is to provide high temperature refractories in accordance with the preceding objects that are characterized by strength at high temperatures at least equal to, and usually greater than, that produced by similar compositions installed promptly after treatment with phosphoric acid.

Still another object is to provide such refractory compositions that may be stored for long periods at normal temperatures without deterioration.

A further object is to produce refractory compositions embodying the foregoing objects by a method that is easily practiced using readily available equipment, and that is simple and efficient.

This invention is predicated upon our discovery that its stated objects are attained by thoroughly incorporating phosphoric acid in a refractory batch comprising, by weight, a major proportion of refractory aggregate that is inert in the composition at room temperature and a minor proportion of aluminous material that is chemically reactive with phosphoric acid at room temperature, followed by drying of the mixture at a temperature not in excess of about 125° F. In this way there is produced a composition which is harmless to the skin, which may be stored at normal ambient temperatures for long periods of time in paper bags and other commonly used inexpensive containers, and which, when the composition is to be used, can be mixed with a small amount of water to produce a plastic, workable mass that promptly develops an air set, the strength of which increases progressively ultimately to develop strength substantially equal to, and usually greater than, that produced by a similar composition that was rammed or otherwise installed in the furnace immediately after the addition of the phosphoric acid.

For instance, in one series of tests there was used a batch consisting of 5 percent of crude bauxite as the reactive aluminous material, balance tabular alumina (inert aggregate) of controlled grind, treated with 8 percent by weight of 75 percent phosphoric acid. Cylinders 2 inches in diameter were pressed immediately and heated to 230° F. Their cold crushing strength was but 9300 p. s. i. Similar cylinders were formed after drying in accordance with the invention and tempering with 1 percent of water; after heating to 230° F. their cold crushing strength was 14,500 p. s. i.

A wide range of materials is applicable as inert refractory aggregates in practice of this invention, examples being tabular alumina, calcined fireclay, calcined bauxite, calcined diaspore, silica, mullite, kyanite, zircon, silicon carbide, chrome ore, and the like. The particular aggregate or combination of two or more aggregates will, of course, depend on the refractoriness and the chemical, hardness or spalling characteristics desired in the finished installation. The only limitation upon the refractory aggregate portion of these compositions is that it must be one that is sufficiently inert that it does not upon addition of the acid produce sufficient heat of reaction to bring the batch temperature over the upper limit of about 125° F., examples of such materials being lime and magnesia.

Likewise, a variety of chemically reactive aluminous materials is applicable for the purposes of the invention, examples being hydrated alumina, raw diaspore, kaolin, bauxite and activated aluminas such, for example, as an activated alumina prepared upon lightly calcining a rock-like form of alpha aluminum trihydrate, e. g., at about 600° to 900° F., and available commercially as Alcoa F Alumina, an activated alumina prepared by controlled calcination of a gelatinous alpha aluminum monohydrate and available commercially as Alcoa H Alumina, and precipitated alpha aluminum trihydrate as produced by the Bayer process having a particle size of one micron or less and available commercially as C730 Hydrated Alumina. These materials naturally vary somewhat in their rate of reaction with phosphoric acid at temperatures up to 125° F. depending upon the particle size and the form of the material but, in general, materials of this class are suitable as the reactive portion of our compositions which reacts with the phosphoric acid to the extent that the batch becomes dry to the touch after limited drying as described, the acid loses its corrosive effect on human skin and shipping containers, the batch on retempering is plastic and workable rather than short or sandy, and bodies formed from the retempered batch have wet, or green, strength and dry or harden well at temperatures up to about 230° F. For many purposes it is now preferred to use hydrated alumina, suitably Bayer process hydrated alumina, as the reactive aluminous portion of these mixes although pulverized crude, or raw, bauxite and diaspore, and other native aluminous minerals are equivalent in action to aluminum hydrate although generally in somewhat larger amounts. Also, certain lightly calcined or "activated" aluminas, such as Alcoa F and H types, may be used as the reactive portion of our mixes although they are not generally preferred because of higher cost and final strength may not be outstanding.

Two or more members of this class of reactive aluminous materials may, of course, be used depending upon the working and final properties desired. When crude clays or kaolin are used the mixes may not dry out completely within the temperature limit of 125° F. although they have been found to be satisfactory in storage and handling and to possess the good working properties and strength characteristics after heating that characterize this invention.

When using Bayer process hydrated alumina it is presently preferred that it constitute from about 1 to 10 percent, and most suitably about 1 to 5 percent, by weight, of the batch. In the case of other reactive aluminous materials they may constitute about 5 to 35 percent of the batch. Thus the reactive aluminous material constitutes the minor proportion of the batch. The remainder of the batch, constituting its major proportion by weight, consists of one or more inert refractory aggregates, such as those listed above, although minor amounts of other materials may be present provided they do not adversely affect the properties of the compositions provided by the invention.

The amount of phosphoric acid used will depend upon the strength of the acid and the composition of the batch. As an example, when using extremely finely divided Bayer process hydrated alumina it has been found desirable to hold it to a maximum of about 5 percent by weight of the batch when using about 4 to 10 percent of 75 percent phosphoric acid in order to obtain maximum strength from the product after retempering and heating to develop strength. When using other reactive aluminous materials, such as those named above, it has been found that the amount used and the ratio of the material to acid are not so important in obtaining maximum strength, and, in general, with equivalent acid content larger amounts of these reactive aluminous materials appear generally to be better. For instance, 15 percent, by weight, of air-floated ball clay in combination with 3 to 7 percent of 75 percent phosphoric acid produced an excellent bond in combination with a coarse grind tabular alumina. For most purposes we prefer to use acid containing at least about 35 percent of $P_2O_5$, although $P_2O_5$ may, of course, be used by adding also an appropriate amount of water.

In the practice of the invention the refractory batch is produced in the manner customary with refractories manufacturers and it is then treated with phosphoric acid in a suitable mixer, and after the acid and batch have been thoroughly mixed to incorporate the acid throughout, the batch is then dried. In some instances the heat of reaction is sufficient to permit reaction and air drying in a reasonably short length of time, but in any case the batch thus prepared may be heat-dried provided, however, that the temperature does not exceed about 125° F., which is critical for the purposes of this invention, and it is upon this limitation that the desirable properties of the compositions of this invention depend. As exemplifying this, reference may be made to one series of tests of a batch composed of 5 percent of C730 hydrated alumina with the balance tabular alumina, treated with 8 percent by weight of 75 percent phosphoric acid. After drying at various temperatures the granular batch was tempered with water and two-inch diameter cylinders were pressed at 4,000 p. s. i., followed by heating at various temperatures. The results were as follows:

| Batch Drying Temp., ° F. | Cold Crushing Strength, p. s. i., after tempering and Heating at— | | |
| --- | --- | --- | --- |
| | 75° F. | 230° F. | 600° F. |
| 75 | 760 | 2,900 | 2,860 |
| 125 | 670 | 2,570 | 3,180 |
| 180 | 490 | 530 | 410 |
| 230 | 180 | 170 | 140 |

These data show strikingly the adverse effect upon cold set strength and strength after heating to higher temperatures that results from heating the batch to temperatures over about 125° F. after adding the phosphoric acid. It may be added that in this series of tests drying at 390° F. rendered the product so weak that strength could not be measured accurately, and even after heating at 2000° F. it was only of the order of 40–60 p. s. i.

It is presently preferred to use about 2 to 15 percent by weight of phosphoric acid of the commonly available 75 percent concentration because according to experience it produces density and strength characteristics in the final heated product at least equal, and generally better than, that developed with acid of greater or lesser concentration. Acid of other concentrations may be used, if desired for any reason, provided it is supplied in an amount to provide a $P_2O_5$ equivalent equal to that supplied by from about 2 to 15 percent by weight of the 75 percent acid. As exemplifying these factors and as showing the unusual strength properties to be had in the practice of the invention, reference may be made to the data of the following table. These results were obtained with a batch of 2.7 percent by weight of C730 hydrated alumina, balance fine tabular alumina, treated with acid of various concentrations but in each instance in an amount equivalent to 8 percent by weight of 75 percent phosphoric acid on a $P_2O_5$ basis. After the acid-treated batches had been dried in accordance with the invention they were tempered with water and pressed at 4,000 p. s. i. to form two-inch diameter cylinders which were then treated as shown in the table.

|  | 50% Acid | 75% Acid | 85% Acid | 115% Acid (polyphosphoric) |
| --- | --- | --- | --- | --- |
| After Air Drying: |  |  |  |  |
| Density (p. c. f) | 196 | 192 | 188 | 189 |
| Cold Crushing Strength (p. s. i.) | 600 | 1,510 | 1,220 | 2,000 |
| After Drying at 230° F.: |  |  |  |  |
| Density (p. c. f.) | 183 | 185 | 181 | 183 |
| Cold Crushing Strength (p. s. i.) | 9,070 | 15,370 | 10,900 | 16,100 |
| After Heating to 600° F.: |  |  |  |  |
| Density (p. c. f.) | 180 | 183 | 179 | 181 |
| Cold Crushing Strength (p. s. i.) | 8,760 | 15,820 | 13,330 | 13,650 |
| After Heating to 2,000° F.: |  |  |  |  |
| Density (p. c. f.) | 177 | 182 | 177 | 180 |
| Cold Crushing Strength (p. s. i.) | 7,190 | 15,550 | 12,390 | 11,720 |

The effect of acid concentration will be evident at once. Of greater significance, however, is the unusually high cold crushing strength developed upon air drying, the exceptional strength in the range from 230° to 600° F., and the very high strength after heating to 2000° F.

These compositions may tend to agglomerate during drying but they are easily broken down by light crushing pressure to form granular compositions that may easily be bagged and handled, as in tempering. Small amounts of water suffice for retempering to produce a plastic mass which can be installed in a furnace or part of a furnace or the like by conventional methods of ramming, gunning, trowelling, tamping or casting. When so installed a set develops which rapidly attains a high and continuous strength upon heating. The amount of water used for tempering will, of course, depend upon the manner in which the composition is to be installed. Thus, for trowelling a larger amount of water will be requisite than when the composition is to be installed by, for example, ramming. For the best results the amount of water should be limited to just that necessary to give the desired plasticity, and for many purposes the amount should not exceed about 3 percent.

As is usual with refractory compositions, the ultimate properties may, in general, be dependent upon the grind of the batch. Such factors are within the ability of those familiar with the art and will depend upon the particular inert aggregates used and properties desired. For the development of maximum strength, however, it should be observed that higher strengths are developed when using very finely divided reactive aluminous materials than where they are of coarser particle size.

Attempts have been made in the past to avoid or minimize the problems connected with using phosphoric acid in refractory products by using various metal phosphates. Some of those salts will produce a continuous strength but at best the strengths developed are of a distinctly lower order than are obtainable in the practice of the invention. Furthermore, phosphoric acid itself has no appreciable effect on the refractoriness of these compositions, which is not the case with the alkali, alkaline earth and heavy metal phosphates, the cations of which tend to exert a fluxing action and thus reduce refractoriness. Aluminum phosphate does not exert deleterious fluxing action but likewise it does not give products in accordance with this invention.

From what has been said it will be realized that the invention overcomes previous objections and difficulties encountered in using phosphoric acid as a bonding agent for refractory products. For instance, it takes acid handling off the job site, where such handling is hazardous, and into the refractory producing plant where proper equipment and safeguards are available. It provides compositions which can be handled easily and subjected to prolonged storage in cheap, disposable containers. Another factor is that the invention provides compositions that temper with small amounts of water to provide good workability, wet strength and air set, coupled with the strength characteristics upon heating that have been delineated above.

It has been found that the use of phosphoric acid may be supplemented by such other agents as sulfuric or other acids to reduce costs although in general such additions do not basically change the properties described. Likewise, such supplemental agents as calcium aluminate cements may be added in small amounts for special purposes without adversely affecting the properties that characterize the invention.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. A high temperature refractory composition composed of unconsolidated particles substantially dry to the touch and consisting essentially of, by weight, a mixture of at least about 65 percent of inert refractory aggregate and the remainder at least one member selected from the group consisting of hydrated alumina, raw bauxite, raw diaspore and raw clays, said mixture being pretreated with concentrated phosphoric acid in an amount to provide $P_2O_5$ equivalent to that provided by about 2 to 15 percent by weight of 75 percent phosphoric acid, and then dried at a temperature not over about 125° F., and which after tempering to plastic condition with water and being molded develops air set and mechanical strength which, upon heating, rapidly becomes high and is continuously maintained high when subjected to elevated temperatures.

2. A composition according to claim 1, said inert aggregate being at least one member selected from the group consisting of tabular alumina, calcined fireclay, calcined bauxite, calcined diaspore, silica, mullite, kyanite, zircon, silicon carbide, and chrome ore.

3. That method of preparing a high temperature refractory composition comprising forming a mixture consisting essentially of, by weight, at least about 65 percent of inert refractory aggregate and the remainder at least one member selected from the group consisting of hydrated alumina, raw bauxite, raw diaspore and raw clays, blending through said mixture concentrated phosphoric acid in an amount to supply $P_2O_5$ equivalent to that provided by about 2 to 15 percent by weight of 75 percent phosphoric acid, drying the resultant mixture at a temperature not exceeding about 125° F., and thereby producing a refractory composition which after tempering to plastic condition with water and being molded develops air set and mechanical strength which, upon heating, rapidly becomes high and is continuously maintained high when subjected to elevated temperatures.

4. A method according to claim 3, said inert aggregate being at least one member selected from the group consisting of tabular alumina, calcined bauxite, calcined diaspore, calcined fireclay, silica, mullite, kyanite, zircon, silicon carbide, and chrome ore.

References Cited in the file of this patent

UNITED STATES PATENTS

| | | |
|---|---|---|
| 1,107,011 | Allen | Aug. 11, 1914 |
| 1,482,793 | Hartmann | Feb. 5, 1924 |
| 2,702,425 | Thompson | Feb. 22, 1955 |

FOREIGN PATENTS

| | | |
|---|---|---|
| 171,888 | Austria | 1952 |